US 6,357,289 B1

(12) United States Patent
Futawatari

(10) Patent No.: US 6,357,289 B1
(45) Date of Patent: Mar. 19, 2002

(54) AUTOMATIC TRANSMISSION CONTROL SYSTEM HAVING FAIL-SAFE FUNCTION

(75) Inventor: Toru Futawatari, Shizuoka (JP)

(73) Assignee: Jatco Transtechnology Ltd., Fuji (JP)

( * ) Notice: Subject to any disclaimer, the term of this patent is extended or adjusted under 35 U.S.C. 154(b) by 0 days.

(21) Appl. No.: 09/632,593

(22) Filed: Aug. 4, 2000

(30) Foreign Application Priority Data

Aug. 20, 1999 (JP) ............................................ 11-233761

(51) Int. Cl.[7] .............................................. G01M 13/02
(52) U.S. Cl. ...................................................... 73/118.1
(58) Field of Search ............................... 73/118.1, 49.7, 73/117.2, 117.3, 119 R, 866.1; 701/51, 62, 64; 340/438, 456

(56) References Cited

U.S. PATENT DOCUMENTS

| | | | | |
|---|---|---|---|---|
| 4,468,958 A | * | 9/1984 | Takeshita .................... | 73/118.1 |
| 4,888,577 A | * | 12/1989 | Dunkley et al. | |
| 5,060,177 A | * | 10/1991 | Gregory et al. ............. | 73/118.1 |
| 5,129,259 A | * | 7/1992 | View et al. .................. | 73/118.1 |
| 5,191,527 A | * | 3/1993 | Asahara et al. ................ | 73/866 |
| 5,467,644 A | * | 11/1995 | Schaffer ..................... | 73/118.1 |
| 5,537,865 A | * | 7/1996 | Shultz ........................ | 73/118.1 |
| 5,712,434 A | * | 1/1998 | Sylvis ........................ | 73/118.1 |
| 6,101,440 A | * | 8/2000 | Wagner et al. ............. | 73/118.1 |

FOREIGN PATENT DOCUMENTS

JP          8-121586         5/1996

* cited by examiner

Primary Examiner—Eric S. McCall
(74) Attorney, Agent, or Firm—Foley & Lardner

(57) ABSTRACT

An automatic transmission control system having a fail-safe function includes an automatic transmission control unit which prestores a normal state of ON-OFF settings of engaging elements and actually detects an actual state of ON-OFF positions (engagements and disengagements) of the engaging elements. The automatic transmission control unit has a comparator capable of comparing the normal state of ON-OFF settings with the actual state of ON-OFF positions of the engaging elements, and determines that a hydraulic system failure occurs when the normal state and the actual state disagree with each other. The automatic transmission control unit has a fail-safe mode engagement-disengagement command section provided for selecting a specified gear mode based on the actual state and for outputting a command to an actuator for the engaging elements, so that the transmission is shifted to the specified gear mode which is preprogrammed to be suitable for the actual state, only when the automatic transmission control unit determines that the hydraulic system failure occurs.

8 Claims, 10 Drawing Sheets

FIG.3

| GEAR \ CLUTCH, BAND | LOW/C | 2-4/B | H/C | L&R/B | R/C |
|---|---|---|---|---|---|
| 1ST | ◯ | ✕ | ✕ | ✕ | ✕ |
| 2ND | ◯ | ◯ | ✕ | ✕ | ✕ |
| 3RD | ◯ | ✕ | ◯ | ✕ | ✕ |
| 4TH | ✕ | ◯ | ◯ | ✕ | ✕ |
| 1ST-ENG. BRAKING | ◯ | ✕ | ✕ | ◯ | ✕ |
| REVERSE | ✕ | ✕ | ✕ | ◯ | ◯ |

◯ ··· ENGAGED (APPLIED)

✕ ··· RELEASE (RELEASED)

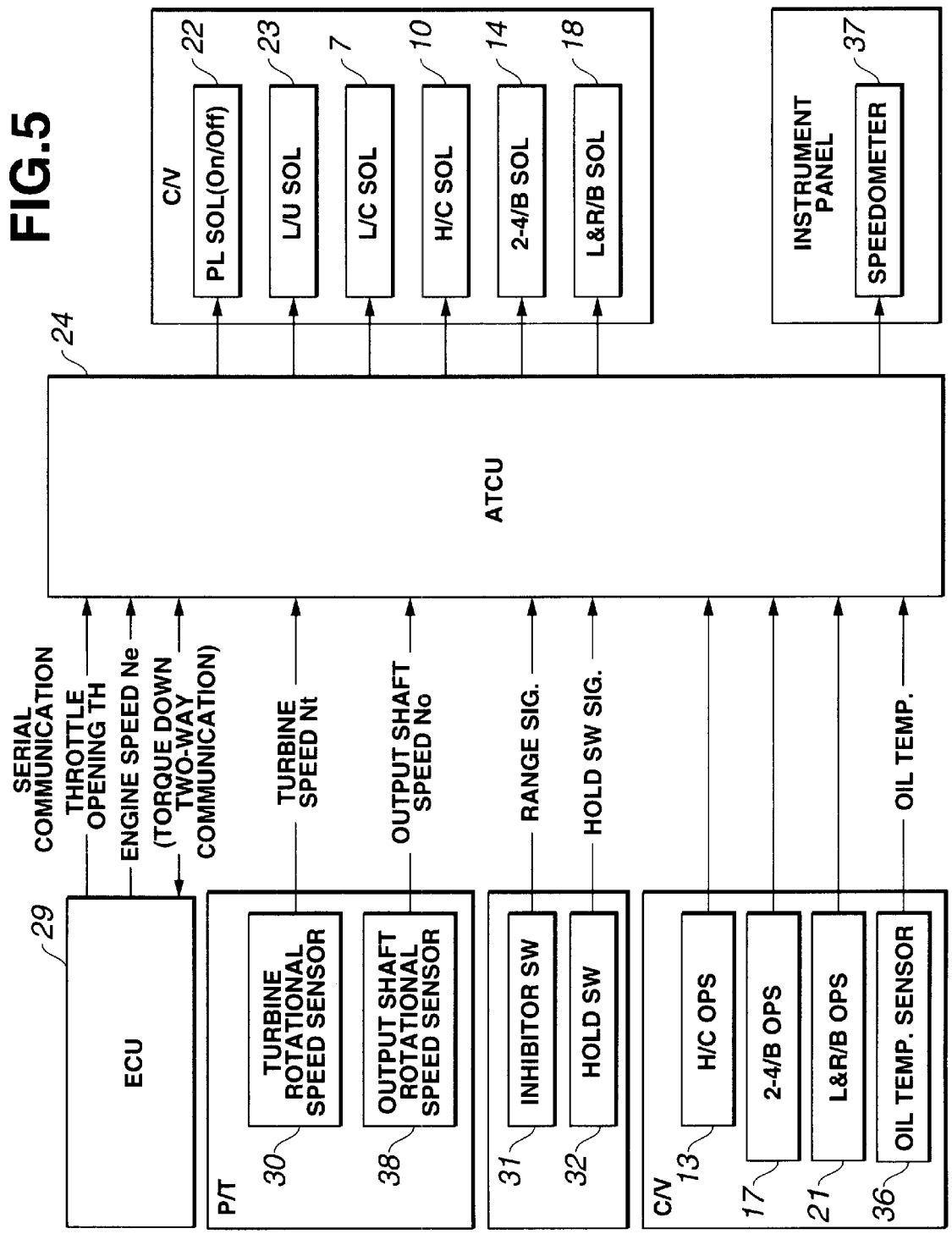

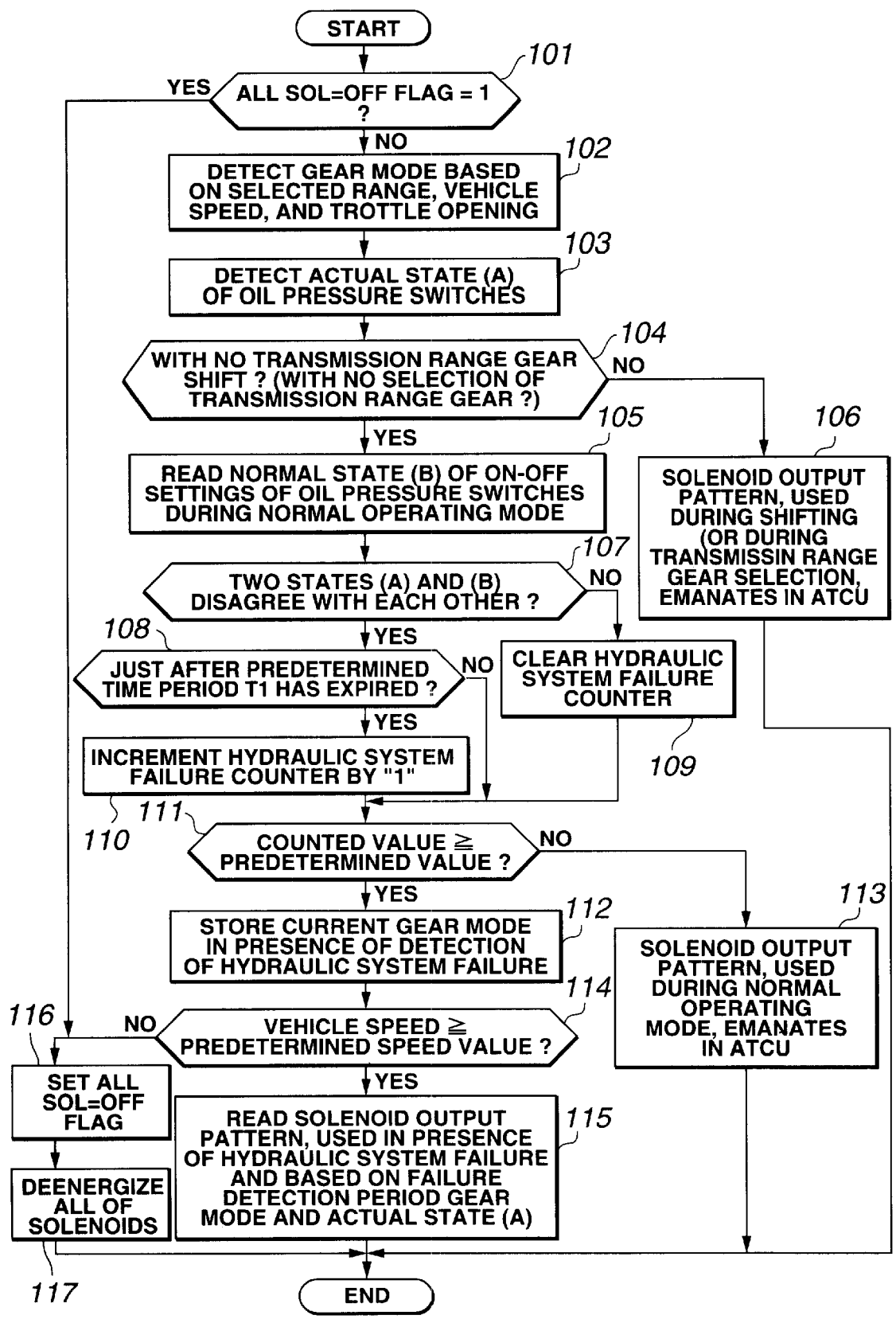

FIG.7

| OIL PRESSURE SWITCH / RANGE GEAR | 2-4/B PRESSURE SWITCH (SW1) | H/C PRESSURE SWITCH (SW2) | L&R/B PRESSURE SWITCH (SW3) |
|---|---|---|---|
| {D RANGE, 2 RANGE} 1ST | OFF | OFF | OFF |
| {D RANGE, 2 RANGE, 1 RANGE} 2ND | ON | OFF | OFF |
| {D RANGE, 2 RANGE, 1 RANGE} 3RD | OFF | ON | OFF |
| {D RANGE, 2 RANGE, 1 RANGE} 4TH | ON | ON | OFF |
| (1 RANGE) 1ST | OFF | OFF | ON |
| (R RANGE) 1ST | OFF | OFF | ON |
| (N RANGE) | OFF | OFF | OFF |

ON ······ SWITCHED ON IN PRESENCE OF APPLICATION OF HYDRAULIC PRESSURE

OFF ······ SWITCHED OFF IN ABSENCE OF APPLICATION OF HYDRAULIC PRESSURE

FIG.8A

SOLENOID OUTPUT PATTERN SELECTION TABLE

| COMBINATION OF OIL PRESSURE SWITCHES / RANGE & GEAR DURING DETECTION OF HYDRAULIC SYSTEM FAILURE | 2-4/B OPS (SW1) | OFF | OFF | OFF | ON | ON | OFF | OFF | ON | ON |
|---|---|---|---|---|---|---|---|---|---|---|
| | H/C OPS (SW2) | OFF | OFF | ON | OFF | ON | OFF | ON | ON | ON |
| | L&R/B OPS (SW3) | OFF | ON | OFF | OFF | OFF | ON | ON | OFF | ON |
| D RANGE 2 RANGE | 1ST GEAR | (B) | B | C | F | F | F | F | F | F |
| D RANGE 1 RANGE 2 RANGE | 2ND GEAR | C | F | (C) | F | F | D | F | E | F |
| D RANGE 1 RANGE 2 RANGE | 3RD GEAR | D | F | F | F | F | (D) | F | E | F |
| D RANGE 1 RANGE 2 RANGE | 4TH GEAR | E | F | E | F | F | E | F | (E) | F |
| 1 RANGE | 1ST GEAR | A | (A) | C | F | F | D | F | E | F |
| R RANGE | — | G | (G) | G | G | G | G | G | G | G |
| N RANGE | — | G | G | G | G | G | G | G | G | G |

SOLENOID OUTPUT PATTERNS IN PARENTHESES ENGAGE WITH THOSE IN NORMAL OPERATING MODE

FIG.8B

SOLENOID OUTPUT PATTERN TABLE

| SOLENOID OUTPUT PATTERN \ SOLENOID | L/C SOL | 24/B SOL | H/C SOL | L&R/B SOL | REMARKS MODES IN PARENTHESES CORRESPONDING TO RANGE GEAR MODES |
|---|---|---|---|---|---|
| A | OFF | ON | ON | OFF | (1ST GEAR-ENG. BRAKING) |
| B | OFF | ON | ON | ON | (1ST GEAR-NO ENG. BRAKING) |
| C | OFF | OFF | ON | ON | (2ND GEAR) |
| D | OFF | ON | OFF | ON | (3RD GEAR) |
| E | ON | OFF | OFF | ON | (4TH GEAR) |
| F | ON | ON | ON | ON | (NEUTRAL) |
| G | OFF | OFF | OFF | OFF | (N RANGE, P RANGE, NEUTRAL) (R RANGE, 1ST GEAR) |

OFF ··· DEENERGIZED (CLUTCH ENGAGED, BAND APPLIED)
ON ··· ENERGIZED (CLUTCH DISENGAGED, BAND RELEASED)

AUTOMATIC TRANSMISSION CONTROL SYSTEM HAVING FAIL-SAFE FUNCTION

BACKGROUND OF THE INVENTION

1. Field of the Invention

The present invention relates to an automatic transmission control system having a fail-safe function, and specifically to hydraulic technologies for a hydraulic control system of an electronically-controlled automatic transmission capable of electronically controlling an engaging pressure of each of engaging elements or controlling elements such as clutches and brake bands directly by means of a transmission ECU (electronic control unit), and of providing simplified hydraulic circuits, reduced hydraulic component parts, small-sized valve bodies, and expanded design flexibility, and lighter hydraulic packages.

2. Description of the Prior Art

In recent years, there have been proposed and developed various electronically-controlled automatic transmissions of simplified hydraulic circuits, reduced hydraulic component parts, and small-sized valve bodies. One such electronically-controlled transmission (which will be hereinafter abbreviated to an "ECT transmission") has been disclosed in Japanese Patent Provisional Publication No. 8-121586. The ECT transmission disclosed in the Japanese Patent Provisional Publication No. 8-121586, has a low-and-reverse brake (L&R/B) pressure control device through which a low-and-reverse brake (L&R/B) is applied or engaged in a drive range and first gear, and released or disengaged in a drive range and either of second, third and fourth (overdrive) gears. In more detail, as shown in FIG. 9, the above-mentioned low-and-reverse brake (L&R/B) pressure control device uses two different hydraulic pressures, namely one being a second brake pressure $P_{2ND}$ which is applied to a second brake for the purpose of applying the second brake in a drive range and second gear or in a drive range (D range) and fourth gear (OD gear), and the other being an overdrive clutch pressure $P_{OD}$ which is applied to an overdrive clutch for the purpose of engaging the overdrive clutch in a drive range and third gear or in a drive range and fourth gear. The low-and-reverse brake (L&R/B) pressure control device functions to forcibly drain the pressure supply line of the low-and-reverse brake in the D range and 2nd gear, in the D range and 3rd gear, or in the D range and 4th gear, in which at least one of the second brake pressure $P_{2ND}$ and the overdrive clutch pressure $P_{OD}$ are created or produced.

SUMMARY OF THE INVENTION

In the hydraulic control device of the electronically-controlled automatic transmission disclosed in the Japanese Patent Provisional Publication No. 8-121586, however, there is no means for detecting as to whether a first spool 51 is sticking in its valve housing. Assuming that a failure in a hydraulic system for the low-and-reverse brake (L&R/B) occurs under a particular condition where the first spool 51 is sticking in the left-hand side position (viewing FIG. 9), the low-and-reverse brake pressure may be created and often held at a high pressure level in the hydraulic system for the low-and-reverse brake (L&R/B). As a result of this, the automatic transmission will fall into a so-called interlocking state in which the low-and-reverse brake and the second brake are both applied or engaged.

Accordingly, it is an object of the invention to provide an automatic transmission control system having a fail-safe function, which avoids the aforementioned disadvantages of the prior art.

It is another object of the invention to provide an automatic transmission control system for an electronically-controlled automatic transmission, which has a fail-safe function capable of providing an optimal timing of a forcible pressure-release of an engaging-element pressure (simply, an engaging pressure) applied to an engaging element or an optimal timing of a forcible oil drain from the engaging element, without exerting a bad influence upon an automatic shifting control and without providing an undesired automatic transmission interlock in presence of a hydraulic system failure.

It is a still further object of the invention to provide a transmission control system for an electronically-controlled automatic transmission, which ensures a reliable hydraulic system failure detection.

In order to accomplish the aforementioned and other objects of the present invention, an automatic transmission control system having a fail-safe function for an automatic transmission, comprises sensor means for detecting at least a throttle opening and a vehicle speed, a gear mode determination means for determining a current gear mode based on the throttle opening and the vehicle speed, an engagement-disengagement command means for outputting a command based on the current gear mode determined by the gear mode determination means and corresponding to engagements and disengagements for a plurality of engaging elements to an actuator which operates the engaging elements, a transmission gear train which performs a multi-step speed-change by a combination of engagements and disengagements of the engaging elements, a set ON-OFF state storage means for estimating a normal state of engagements and disengagements of the engaging elements based on the current gear mode, and for storing the normal state of engagements and disengagements of the engaging elements, an actual ON-OFF state detection means for detecting an actual state of engagements and disengagements of the engaging elements, an actual ON-OFF state storage means for storing the actual state of engagements and disengagements of the engaging elements, a comparison-and-determination means for comparing the normal state of engagements and disengagements of the engaging elements, stored in the set ON-OFF state storage means, with the actual state of engagements and disengagements of the engaging elements, stored in the actual ON-OFF state storage means, and for determining that a hydraulic system failure occurs when the actual state detected and the normal state estimated disagree with each other, and a fail-safe mode engagement-disengagement command means for selecting a specified gear mode based on the actual state of engagements and disengagements of the engaging elements, stored in the actual ON-OFF state storage means, and for outputting a command corresponding to engagements and disengagements of the engaging elements to the actuator so that the automatic transmission is shifted to the specified gear mode which is preprogrammed to be suitable for the actual state, only when the comparison-and-determination means determines that the hydraulic system failure occurs. It is preferable that the comparison-and-determination means has a hydraulic system failure counter whose counted value is incremented once each time a state that the actual state detected disagrees with the normal state estimated occurs continuously for a predetermined time period. The comparison-and-determination means determines that the hydraulic system failure occurs only when the counted value of the hydraulic system failure counter reaches a predetermined value. More preferably, the specified gear mode selected by the fail-safe mode engagement-disengagement command means may be preprogrammed to remain at a gear mode determined by the gear mode determination means just before detecting the hydraulic system failure, or to be up-shifted with respect to the gear mode determined by the gear mode determination means just before detecting the hydraulic system failure, or to shift the automatic transmission to neutral. It is preferable that the output of the command corresponding to the specified gear mode selected by the fail-safe mode engagement-disengagement command means may be limited to only a time period from a time when the hydraulic system failure is detected to a time when the vehicle speed becomes less than a predetermined low speed value. More preferably, the actual ON-OFF state detection means may comprise an oil pressure switch provided for detecting a hydraulic pressure in a hydraulic system containing each of the engaging elements. Furthermore, the comparison-and-determination means may comprise an inhibition means inhibiting a diagnosis upon a hydraulic system failure during shifting or during transmission range gear selection during which there is a transition of at least one of the engaging elements from one of engaged and disengaged states to the other.

BRIEF DESCRIPTION OF THE DRAWINGS

FIG. 3 is a chart of clutch engagements and band applications for various transmission operating conditions in the ECT transmission to which the transmission control system of the embodiment can be applied.

FIG. 5 is a block diagram of an electronic control system for the ECT transmission employing the transmission control system of the embodiment.

FIG. 6 is a flow chart illustrating a control routine (a fail-safe routine) executed by the transmission control system of the embodiment in presence or absence of a hydraulic system failure.

FIG. 7 is a chart illustrating the relationship among a shift-lever position, a gear position, and ON-OFF settings of three different oil pressure switches (SW1, SW2, SW3) obtained during the normal operating period in the ECT transmission to which the transmission control system of the embodiment is applied.

FIG. 8A is a solenoid output pattern selection table for four solenoids, namely a low-clutch solenoid (L/C SOL), a 2–4 brake solenoid (2–4/B SOL), a high-clutch solenoid (H/C SOL), and a low-and-reverse brake solenoid (L&R/B SOL), in presence of a hydraulic system failure.

FIG. 8B is a solenoid output pattern table showing seven different patterns A–G and ON-OFF positions of solenoid valves (L/C SOL, 2–4/B SOL, H/C SOL, L&R/B SOL), in presence of the hydraulic system failure.

DESCRIPTION OF THE PREFERRED EMBODIMENTS

Figure 2:
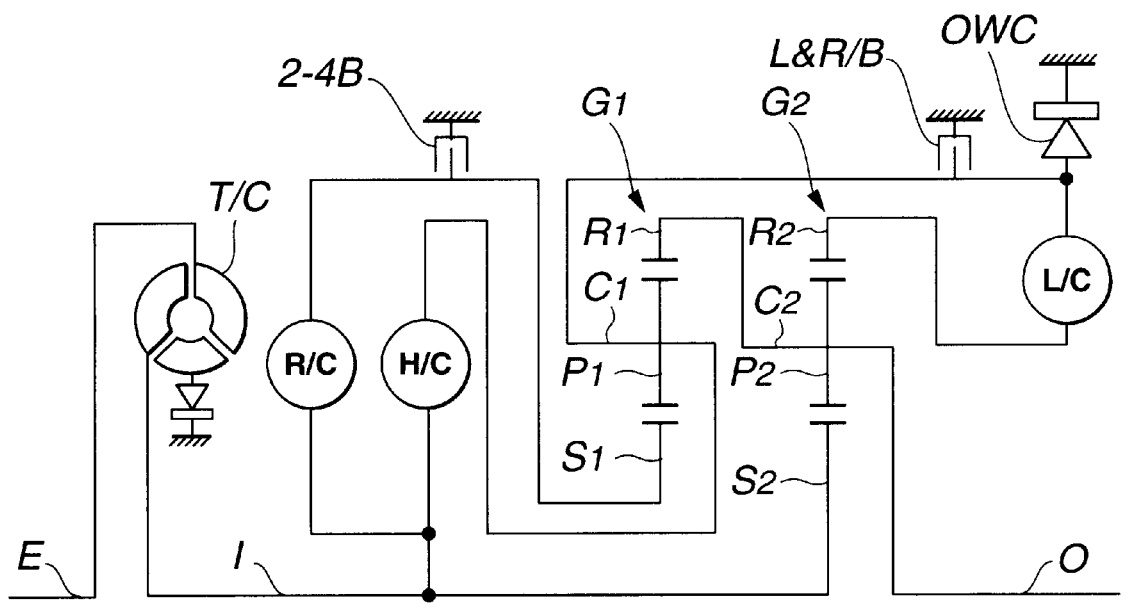
FIG. 2 is a schematic view illustrating a power train to which the transmission control system of an embodiment can be applied.

Referring now to the drawings, particularly to FIG. 2, the automatic transmission control system having a fail-safe function of the invention is exemplified in an electronically-controlled automatic transmission (ECT transmission) using a lock-up torque converter with a lock-up clutch. In the power-train layout (the transmission gear train) shown in FIG. 2, E denotes an engine output shaft (an engine crankshaft), I denotes a transmission input shaft, and O denotes a transmission output shaft. A torque converter T/C is disposed between the engine output shaft E and the transmission input shaft I, to couple the engine with the power train. Two sets of planetary gearsets, namely a first planetary gearset G1 and a second planetary gearset G2, are provided between the transmission input shaft I and the transmission output shaft O. The first planetary gearset G1 is comprised of a simple planetary gearset consisting of a first pinion P1 (usually, a plurality of planet pinions), a first pinion carrier C1, a first sun gear S1, and a first ring gear R1, whereas the second planetary gearset G2 is comprised of a simple planetary gearset consisting of a second pinion P2 (usually, a plurality of planet pinions), a second pinion carrier C2, a second sun gear S2, and a second ring gear R2. The transmission input shaft I is connected directly to the second sun gear S2 generally by way of spline connection. A reverse clutch R/C is provided in the middle of a first member through which the transmission input shaft I is connectable to the first sun gear S1. In order to be able to fixedly connect the above-mentioned first member to the transmission case, a 2–4 brake (2–4/B) is also provided. The 2–4 brake has a multi-disk brake structure. A high clutch H/C is provided in the middle of a second member through which the transmission input shaft I is connectable to the first pinion carrier C1. A low clutch L/C is provided in the middle of a third member through which the first pinion carrier C1 is connectable to the second ring gear R2. In order to be able to fixedly connect the previously-noted third member to the transmission case, a low-and-reverse brake L&R/B is provided. The low-and-reverse brake L&R/B has a multi-disk brake structure. In parallel with the low-and-reverse brake L&R/B, a one-way clutch OWC is also provided. As seen in FIG. 2, the first ring gear R1 is connected directly to the second pinion carrier C2. The second pinion carrier C2 is connected directly to the transmission output shaft O generally by way of spline connection.

Referring now to FIG. 3, there is shown a preprogrammed logical table (a preprogrammed clutch-engagement and band-application chart) for clutch engagements and band applications for reverse range (R), drive range (D) and first gear (1st), drive range (D) and second gear (2nd), drive range (D) and third gear (3rd), drive range (D) and fourth gear (4th or OD), and drive range (D) and fist gear (1st) and engine braking in the ECT transmission. In the logic table shown in FIG. 3, ○ denotes engagement of the clutch (L/C, H/C, R/C) or application of the brake (2–4/B, L&R/B), whereas X denotes disengagement of the clutch or release of the brake. As seen from the logic table of FIG. 3, when the transmission is in reverse (R range), the reverse clutch R/C and the low-and-reverse brake L&R/B are both applied or engaged. When the transmission is in D range and first gear, the low clutch L/C is engaged. When the transmission is in D range and second gear, the low clutch L/C and the 2–4 brake 2–4/B are both applied or engaged. When the transmission is in D range and third gear, the low clutch L/C and the high clutch H/C are both engaged. When the transmission is in D range and fourth gear, the high clutch H/C and the 2–4 brake 2–4 /B are both engaged or applied. When the transmission operates in low range (L) hold mode (HOLD) and first gear, that is, during engine braking at the first gear, the low clutch L/C and the low-and-reverse brake L&R/B are both engaged or applied.

Figure 4:
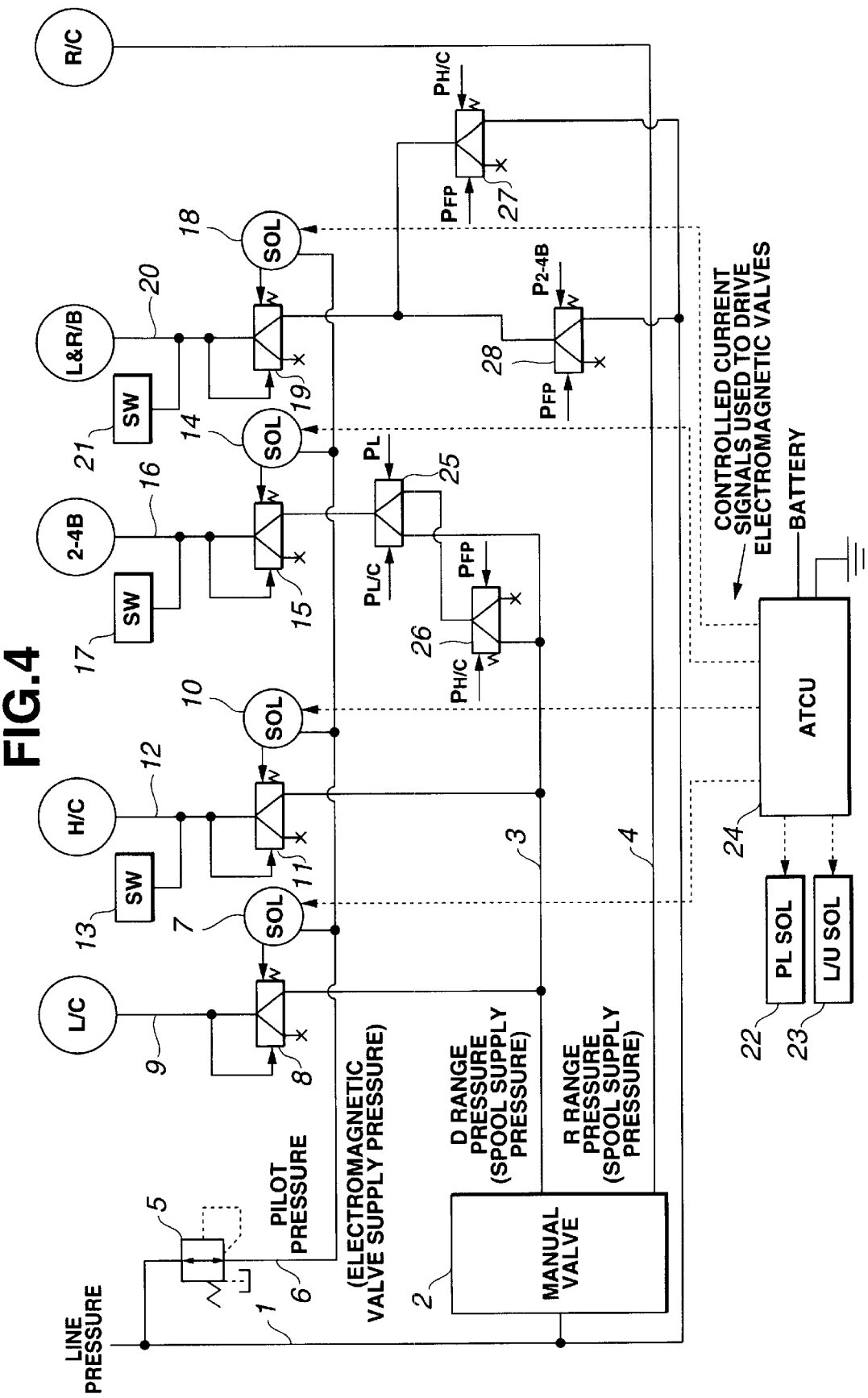
FIG. 4 is a system diagram illustrating an automatic shift control system (containing a hydraulic system) in the ECT transmission to which the transmission control system of the embodiment can be applied.
Figure 9:
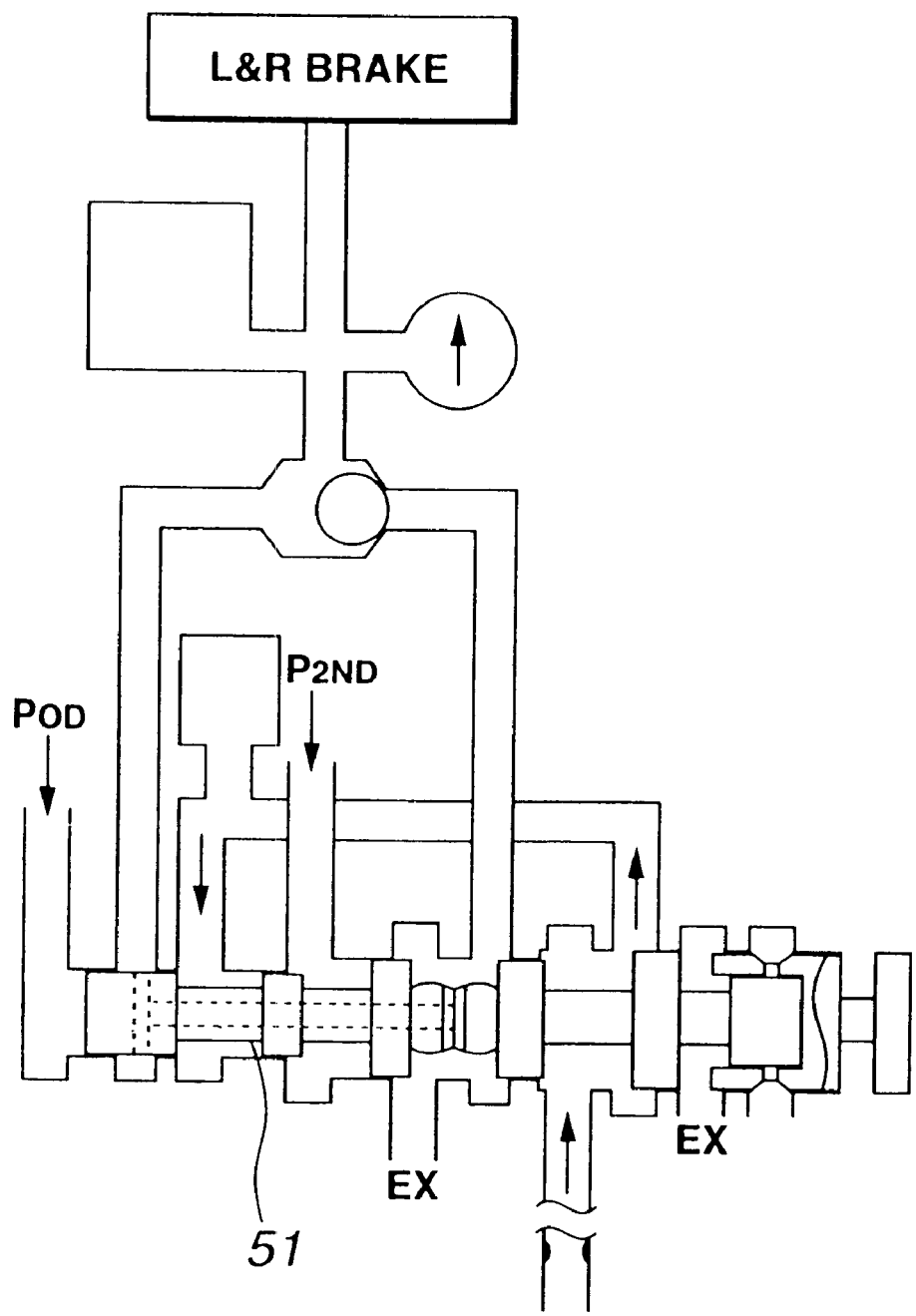
FIG. 9 is a schematic diagram showing a prior-art hydraulic control device of an automatic transmission.

Referring to FIG. 4, there is shown the automatic shift control system containing a hydraulic control system and an automatic transmission control unit (ATCU) in the ECT transmission to which the transmission control system of the embodiment is actually applied. In FIG. 4, a line denoted by 1 is a line-pressure line for a line pressure $P_L$, a valve denoted by 2 is a manually-actuated valve, simply called a "manual valve", a line denoted by 3 is a drive-range (D-range) pressure line, and a line denoted by 4 is a reverse-range (R-range) pressure line. As appreciated, the manual valve 2 is mechanically linked via a linkage to a transmission selector lever (or a control lever) to provide a driver's manual selection from various selector-lever positions, such as L or 1, 2, D, N, R, and P range positions. When the D range position is selected, the manual valve 2 operates to connect the line-pressure line 1 to the D-range pressure line 3. On the other hand, when the R range position is selected, the manual valve 2 operates to connect the line-pressure line 1 to the R-range pressure line 4. In FIG. 4, reference sign 5 denotes a pilot valve, while reference sign 6 denotes a pilot-pressure line. The pilot valve 5 is provided to reduce the line pressure $P_L$ fed from the line-pressure line 1 into the pilot-pressure line 6 to a predetermined constant pilot pressure. Reference sign 7 denotes a duty-cycle controlled low-clutch solenoid valve (simply, low-clutch solenoid) which is provided to supply a regulated pressure to a low-clutch amplifier valve 8. The low-clutch amplifier valve 8 is provided to create a low-clutch pressure $P_{L/C}$ from the D-range pressure $P_D$. The low-clutch pressure $P_{L/C}$ is introduced via a low-clutch pressure line 9 to the low clutch L/C. Reference sign 10 denotes a duty-cycle controlled high-clutch solenoid valve (simply, high-clutch solenoid) which is provided to supply a regulated pressure to a high-clutch amplifier valve 11. The high-clutch amplifier valve 11 is provided to create a high-clutch pressure $P_{H/C}$ from the D-range pressure $P^D$. The high-clutch pressure $P_{H/C}$ is introduced via a high-clutch pressure line 12 to the high clutch H/C. High-clutch pressure switch 13 is located on or connected to the high-clutch pressure line 12 to monitor the high-clutch pressure $P_{H/C}$ to the high clutch H/C (that is, supply of high-clutch pressure $P_{H/C}$). Actually, at the same time when hydraulic pressure (i.e., high-clutch pressure) is supplied to the high clutch H/C, the same hydraulic pressure is supplied to the high-clutch pressure switch 13, thus enabling the high-clutch pressure switch 13 to be switched on. Reference sign 14 denotes a duty-cycle controlled 2–4 brake solenoid valve (simply, 2–4 brake solenoid) which is provided to supply a regulated pressure to a 2–4 brake amplifier valve 15. The 2–4 brake amplifier valve 15 is provided to create a 2–4 brake pressure $P_{2-4/B}$ from the D-range pressure $P_D$. The 2–4 brake pressure $P_{2-4/B}$ is introduced via a 2–4 brake pressure line 16 to the 2–4 brake (2–4 /B). 2–4 brake pressure switch 17 is located on or connected to the 2–4 brake pressure line 16 to monitor the 2–4 brake pressure $P_{2-4/B}$ to the 2–4 brake, (that is, supply of 2–4 brake pressure $P_{2-4/B}$). At the same time when hydraulic pressure (i.e., 2–4 brake pressure) is supplied to the 2–4 brake (2–4/B), the same hydraulic pressure is supplied to the 2–4 brake pressure switch 17, thus enabling the 2–4 brake pressure switch 17 to be switched on. Reference sign 18 denotes a low-and-reverse brake solenoid valve 18 (simply, L&R/B solenoid) which is provided to supply a regulated pressure to a low-and-reverse brake amplifier valve 19. The low-and-reverse brake amplifier valve 19 is provided to create a low-and-reverse brake pressure $P_{L\&R/B}$ from the line pressure $P_L$. In the previously-noted valves 8, 11, 15, and 19, x denotes a drain port. The low-and-reverse brake pressure $P_{L\&R/B}$ is introduced via a low-and-reverse brake pressure line 20 to the low-and-reverse brake L&R/B. Low-and-reverse brake pressure switch 21 is located on or connected to the low-and-reverse brake pressure line 20 to monitor the low-and-reverse brake pressure $P_{L\&R/B}$ to the low-and-reverse brake L&R/B (that is, supply of low-and-reverse brake pressure $P_{L\&R/B}$). In FIG. 4, reference sign 22 denotes an ON/OFF controlled pressure control solenoid which is provided for switching the line pressure ($P_L$) between a high-pressure mode and a low-pressure mode. Reference sign 23 denotes a duty-cycle controlled lock-up solenoid which is provided to activate (engage) or deactivate (disengage) the torque converter lock-up clutch. The previously-discussed pressure-control solenoid valves 7, 10, 14, 18, 22 and 23 are driven or energized by means of the electronic automatic transmission control unit (ATCU) 24. The input/output interface (I/O) of the ATCU 24 receives input information from an electronic engine control unit (ECU) 29, and various engine/vehicle switches and sensors (see the left-hand side of the block diagram shown in FIG. 5). Within the ATCU 24, a central processing unit (CPU) allows the access by the I/O interface of various input informational data signals, for example, an engine speed Ne, a throttle opening TH, a turbine speed Nt, a transmission output shaft speed No, a selected-range indicative signal, a hold switch signal, a H/C oil pressure switch signal, a 2–4/B oil pressure switch signal, a low-and-reverse brake oil pressure switch signal, an oil temperature sensor signal, and the like. The CPU of the ATCU is responsible for carrying the engine/transmission program stored in memories (RAM, ROM) and is capable of performing necessary arithmetic and logic operations containing an automatic shifting control routine. Computational results (arithmetic calculation results), that is, calculated output signals (solenoid drive currents) are relayed via the output interface circuitry of the ATCU 24 to output stages, namely the respective solenoids 22, 23, 7, 10, 14, and 18 (see the right-hand side of the block diagram shown in FIG. 5). In FIG. 4, reference sign 25 denotes a 2–4 /B, first fail-safe valve. The 2–4/B, first fail-safe valve 25 is a hydraulic-actuated valve which uses a fail-safe pressure $P_{FP}$ normally acting on one side of a spool land (the fail-safe pressure $P_{FP}$ substantially corresponding to a pressure level equal to the maximum high-clutch pressure for the high clutch H/C engaged in the D range and higher gears such as 3rd gear or 4th gear) and the low-clutch pressure $P_L/C$ acting the other side of the spool land as operating signal pressures. On the other hand, reference sign 26 denotes a 2–4/B, second fail-safe valve. The 2–4/B, second fail-safe valve 26 is a hydraulic-actuated valve which uses the previously-noted fail-safe pressure $P_{FP}$ normally acting on one side of a spool land and the high-clutch pressure $P_{H/C}$ acting the other side of the spool land as operating signal pressures. In the D range and 3rd gear in which the low-clutch pressure $P_{L/C}$ and the high-clutch pressure $P_{H/C}$ occur concurrently, the high-clutch pressure $P_{H/C}$ is applied to the 2–4/B, second fail-safe valve 26, while the low-clutch pressure $P_{L/C}$ is applied to the 2–4/B, first fail-safe valve 25. As a result of this, the D-range pressure PD is drained, and thus the 2–4 brake pressure $P_{2-4/B}$ can be forcibly drained.

Reference sign 27 denotes a low-and-reverse brake, first fail-safe valve. The L&R/B, first fail-safe valve 27 is a hydraulic-actuated valve which uses the previously-noted fail-safe pressure $P_{FP}$ normally acting on one side of a spool land and the high-clutch pressure $P_{H/C}$ acting the other side of the spool land as operating signal pressures. On the other hand, reference sign 28 denotes a low-and-reverse brake, second fail-safe valve. The L&R/B, second fail-safe valve 28 is a hydraulic actuated valve which uses the previously-noted fail-safe pressure $P_{FP}$ normally acting on one side of a spool land and the 2–4/B pressure P2–4/B acting the other side of the spool land as operating signal pressures. In the D range and either one of 2nd, 3rd, and 4th gear modes, in which at least one of the high clutch pressure $P_{H/C}$ and the 2–4 brake pressure P2–4/B occurs, the low-and-reverse brake pressure $P_{L\&R/B}$ can be forcibly drained by draining the line pressure $P_L$.

Hereunder described in reference to the block diagram shown in FIG. 5 are details of the electronic control system of the ECT transmission employing the transmission control system of the embodiment.

By way of serial communication, the input/output (I/O) interface of the ATCU 24 receives at least two engine/vehicle sensor signals from the electronic engine control unit (ECU) 29. One of the engine/vehicle sensor signals is a throttle opening sensor signal indicative of a throttle opening TH, and the other is an engine speed sensor signal indicative of an engine speed Ne. A torque-down two-way communication is performed between the ECU 29 and the ATCU 24. The I/O interface of the ATCU 24 also receives a turbine speed indicative signal Nt from a turbine speed sensor 30 and an output shaft speed indicative signal No from a transmission output shaft speed sensor 38. The turbine speed sensor 30 and the transmission output shaft speed sensor 38 are provided at the power train. Additionally, the I/O interface of the ATCU 24 receives various switch signals (that is, the selected-range indicative signal, the hold switch signal, the H/C oil pressure switch signal, the 2–4/B oil pressure switch signal, the L&R/B oil pressure switch signal) from an inhibitor switch 31, a hold switch 32, the H/C pressure switch 13, the 2–4/B pressure switch 17, and the L&R/B pressure switch 21. A high-level signal from the H/C pressure switch 13 indicates the H/C pressure supply. A high-level signal from the 2–4/B pressure switch 17 indicates the 2–4 brake pressure supply. A high-level signal from the L&R/B pressure switch 21 indicates that the low-and-reverse brake (L&R/B) pressure supply. On the contrary, a low signal level from the respective oil pressure switch (OPS) means that the corresponding engaging element is off (released) or indicates no pressure supply. Also, the oil-temperature indicative signal from an oil temperature sensor 36 is input into the I/O interface of the ATCU 24. Solenoid drive currents are output from the I/O interface of the ATCU 24 to the respective solenoids 7, 10, 14, 18, 22, and 23. As is generally known, the output shaft speed No monitored or sensed by the transmission output shaft speed sensor 38 is often used as a vehicle speed. The vehicle speed indicative signal (the transmission output shaft speed indicative signal) is used to indicate vehicle speed by means of a speedometer 37 built in an instrument panel.

Referring now to FIG. 6, there is shown the fail-safe routine executed by the ATCU 24 incorporated in the transmission control system of the embodiment and used to determine a proper solenoid output pattern for four solenoid valves, that is, the low-clutch solenoid valve (L/C SOL) 7, the 2–4/B solenoid valve (2–4/B SOL) 14, the high-clutch solenoid valve (H/C SOL) 10, and the low-and-reverse brake solenoid valve (L&R/B SOL) 18, in the presence or absence of a hydraulic system failure.

At step 101, a check is made to determine whether all of the solenoids (L/C SOL, 2–4/B SOL, H/C SOL, and L&R/B SOL) are turned off or de-energized. Concretely, such turned-off states of all of the solenoids are checked by way of setting or resetting of a "ALL SOL=OFF flag" which will be described later. When the answer to step 101 is in the affirmative (YES), i.e., in case of ALL SOL=OFF flag=1, the routine proceeds from step 101 to step 116. Conversely, when the answer to step 101 is in the negative (NO), the routine flows from step 101 to step 102. At step 102, a gear mode (or a gear position) is detected or determined or retrieved on the basis of three factors, namely the vehicle speed (the output shaft speed No sensed by the transmission output shaft speed sensor 38), the throttle opening TH detected by the throttle opening sensor, and the selected range indicative input informational signal from the inhibitor switch 31. Subsequently to step 102, step 103 occurs. At step 103, an actual state of ON-OFF positions of the three pressure switches (2–4/B pressure switch SW1, high-clutch pressure switch SW2, and L&R/B pressure switch SW3) is detected. At this time, the actual state of ON-OFF positions of pressure switches SW1, SW2, and SW3 (detected through step 103) is stored as a state (A) in a predetermined memory address of the memories (RAM) of ATCU 24. Thereafter, at step 104, a check is made to determine whether an automatic transmission range gear shift (or a transmission range gear selection) does not occur. When the answer to step 104 is affirmative (YES), that is, when the transmission range gear shift (or the transmission range gear selection) does not occur, the routine proceeds from step 104 to step 105. In contrast, when the answer to step 104 is negative (NO), that is, during shifting or during selection of the transmission range gear, the routine proceeds from step 104 to step 106. At step 105, a normal state (a set state) of ON-OFF settings of the 2–4/B pressure switch SW1, the high-clutch pressure switch SW2, and the L&R/B pressure switch SW3 (a normal combination of ON and-OFF settings of respective pressure switches SW1, SW2 and SW3 in the normal operating mode of the automatic transmission) is read or retrieved or estimated based on the current transmission range gear position (the selected transmission range gear position detected at a current cycle) from a predetermined characteristic map or a preprogrammed lookup table as shown in FIG. 7. The normal state read through step 105 is stored as a state (B) in a predetermined memory address of the memories (RAM) of ATCU 24. At step 106, a solenoid output pattern of the solenoids 7, 10, 14 and 18, used during shifting or during transmission range gear selection, emanates in the ATCU. At step 107, a test is made to determine whether the state (A), that is, the actually-detected state of the ON-OFF positions of the pressure switches SW1, SW2 and SW3, disagrees with the state (B), that is, the normal state of the ON-OFF settings of the pressure switches (SW1, SW2, SW3) estimated or map-retrieved based on the current transmission range gear position. When the answer to step 107 is in the affirmative (YES), that is, the states (A) and (B) disagree with each other, step 108 occurs. Conversely, when the answer to step 107 is negative (NO), that is, the states (A) and (B) agree with each other, the routine proceeds from step 107 to step 109. At step 108, a check is made to determine whether a predetermined time period T1 has expired. A timer incorporated in the ATCU 24 measures an elapsed time from a time when the states (A) and (B) disagree with each other. The measurement of the elapsed time achieved by the timer is continuously executed while the two states (A) and (B) disagree with each other. When the answer to step 108 is affirmative (YES), that is, just after the elapsed time has reached the predetermined time period T1, in other words, the predetermined time period T1 has expired, the routine proceeds from step 108 to step 110. Conversely, when the answer to step 108 is negative (NO), that is, when the predetermined time period T1 has not yet expired, the routine jumps from step 108 to step 111. At step 109, a hydraulic system failure counter is cleared to "0". At step 110, the counted value of the hydraulic system failure counter is counted up or incremented by "1". At step 111, a check is made to determine whether the counted value of the hydraulic system failure counter reaches a predetermined value. When the answer to step 111 is affirmative (YES), step 112 occurs. Conversely, when the counted value of the hydraulic system failure counter does not yet reach the predetermined value, the routine flows from step 111 to step 113. At step 112, a more recent gear mode, detected during execution of the current cycle of the fail-safe routine and in presence of detection of the hydraulic system failure, is stored as a hydraulic system failure detection period gear mode in a predetermined memory address. At step 113, a solenoid output pattern of the solenoids 7, 10, 14 and 18, used during the normal operating mode of the transmission, emanates in the ATCU. At step 114, a check is made to determine whether the current data of vehicle speed detected is above a predetermined speed value (a predetermined low speed value). When the answer to step 114 is affirmative (YES), the routine advances to step 115. Conversely, when the answer to step 114 is negative (NO), the routine proceeds to step 116. At step 115, a solenoid output pattern of the solenoids 7, 10, 14 and 18, used in the presence of a hydraulic system failure and based on the system failure detection period gear mode and the state (A) of the ON-OFF positions of pressure switches SW1, SW2 and SW3, is read or map-retrieved from a predetermined characteristic map or a predetermined lookup table as shown in FIG. 8A, and then emanates in the ATCU. At step 116, the ALL SOL=OFF flag is set at "1". After this, at step 117, all of the solenoids 7, 10, 14 and 18 are de-energized or turned off. As can be appreciated from the flow from step 114 via step 116 to step 117, if the vehicle speed detected is below the predetermined speed value, there is less risk even in the presence of the hydraulic system failure. Thus, all of the solenoids (7, 10, 14, 18) are deenergized or turned off (see step 117), and simultaneously the "ALL SOL=OFF" flag is set (see step 116). All of the solenoids (L/C SOL, 2–4/B SOL, H/C SOL, L&R/B SOL) remain off, until the "ALL SOL=OFF" flag is cleared to "0" by resetting operation. As discussed above, setting the "ALL SOL=OFF" flag at "1" means that all of the solenoid valves (7, 10, 14, 18) are turned on, whereas resetting the "ALL SOL=OFF" flag at "0"means that all of the solenoid valves (7, 10, 14, 18) are turned off. As seen from step 102, a gear mode (or a gear position) is detected or determined or retrieved based on input information, such as the selected range indicative input informational signal, the vehicle speed, and the throttle opening TH, from a predetermined shift schedule map. Additionally, in the transmission control system of the fail-safe function of the embodiment, the actual state of the ON-OFF positions of the three oil pressure switches (SW1, SW2, SW3) is detected instead of detection of an actual state of clutch engagements and band applications. During shifting or during transmission range gear selection, there is a transition of clutch and/or band from one of engaged and disengaged states to the other. During such a transition, the hydraulic pressure in at least one of the pressure lines (12, 16, 20) also changes, and thus the state of at least one of the oil pressure switches (SW1, SW2, SW3) also changes. Under such a condition, it is impossible to reliably accurately detect or monitor hydraulic system failure. For this reason, the system of the embodiment never makes a diagnosis on a hydraulic system failure, during shifting or during transmission range gear selection. Thus, during shifting or during transmission range gear selection, the routine proceeds from step 104 to step 106, so as to output a solenoid output patter which is preprogrammed or predetermined to be suitable for the shifting period or the transmission range gear selection period. On the other hand, when the transmission range gear shift (or the transmission range gear selection) does not occur, a normal state of ON-OFF settings of the oil pressure switches SW1, SW2, and SW3 (a normal combination of ON and OFF settings of the pressure switches SW1, SW2 and SW3 in the normal operating mode of the automatic transmission) is read based on the current transmission range gear position, through step 105. Actually, in the system of the embodiment, the normal state of ON-OFF settings of the oil pressure switches SW1, SW2, and SW3 is map-retrieved from the preprogrammed characteristic map shown in FIG. 7. According to the system of the embodiment, the normal state (B) of the ON-OFF settings of the oil pressure switches SW1, SW2, and SW3, estimated or map-retrieved (see step 105) from the preprogrammed map shown in FIG. 7, is compared with the actual state (A) of the ON-OFF positions of the oil pressure switches SW1, SW2, and SW3, detected (see step 103). If the states (A) and (B) disagree with each other continuously for the predetermined time period T1, just after that, the hydraulic system failure counter is incremented by "1". If the states (A) and (B) agree with each other, the hydraulic system failure counter is cleared. In this manner, when the counted value of the hydraulic system failure counter reaches the predetermined counted value, the CPU of ATCU 24 determines that the hydraulic system failure occurs. Additionally, according to the system of the embodiment, when the vehicle speed is above the predetermined speed value in the presence of the hydraulic system failure, the routine proceeds from step 114 to step 115, so as to emanate a solenoid output pattern of the L/C, 2–4/B, H/C, and L&R/B solenoids 7, 14, 10, and 18, which pattern is preprogrammed to be suitable for a specified condition where the hydraulic system failure occurs and the vehicle speed is above the predetermined speed value. FIG. 8A shows an example of the solenoid output pattern preprogrammed to be suitable for the presence of hydraulic system failure and the vehicle speed above the predetermined speed value. As seen from the preprogrammed solenoid output pattern selection table of FIG. 8A, the solenoid output pattern is map-retrieved on the basis of the system failure detection period gear mode and the actual state (A) of the ON-OFF positions of pressure switches SW1, SW2 and SW3. Additionally, the solenoid output pattern of FIG. 8A is preprogrammed such that the system failure detection period gear mode remains unchanged or the transmission is up-shifted from the system failure detection period gear mode. In such a case that the transmission will fall into an interlocking state, in other words, in such a case that the transmission interlock may be detected, a solenoid output pattern F is selected in a manner such that the transmission is shifted to neutral. In either of P, N, and R ranges not concerned with upshifting or downshifting, a solenoid output pattern G is selected in a manner such that all of the L/C, 2–4/B, H/C, and L&R/B solenoids (7, 14, 10, 18) are turned off.

In the presence of a low-and-reverse brake system failure, the system of the embodiment operates as follows.

Suppose that the low-and-reverse brake, second fail-safe valve 28 is stuck at the extension side of the spool spring in a second gear, and additionally there is an oil leakage in an oil passage of the low-and-reverse brake L&R/B, and thus hydraulic pressure is applied to the low-and-reverse brake. During the normal operating mode of the transmission, in the 2nd gear, a normal combination of ON-OFF settings of the 2–4 brake pressure switch SW1, the high-clutch pressure switch SW2, and the low-and-reverse brake switch SW3 is (ON, OFF, OFF). However, owing to application of hydraulic pressure to the L&R/B, arising from the low-and-reverse brake system failure, the low-and-reverse brake oil pressure switch 21 (SW3) becomes turned on. In this case, the ATCU 24 determines that the transmission falls into an interlocking state, and then selects a solenoid output pattern F. By selecting the solenoid output pattern F, the transmission is shifted to neutral, and therefore the dangerous gear mode can be avoided.

In the presence of a 2–4 brake system failure, the system of the embodiment operates as follows.

Suppose that there is an oil leakage in an oil passage in the 2–4 brake in a third gear, and thus hydraulic pressure is applied to the 2–4 brake. During the normal operating mode of the transmission, in the 3rd gear, a normal combination of ON-OFF settings of the 2–4 brake pressure switch SW1, the high-clutch pressure switch SW2, and the low-and-reverse brake switch SW3 is (OFF, ON, OFF). However, owing to application of hydraulic pressure to the 2–4 brake, arising from the 2–4 brake system failure, the 2–4 brake pressure switch 17 (SW1) is turned on. That is, in the presence of the 2–4 brake system failure, a combination of the ON-OFF settings of the solenoids is changed from the normal combination (OFF, ON, OFF) to a new combination (ON, ON, OFF). In the 3rd gear mode, the normal combination (OFF, ON, OFF) corresponds to a solenoid output pattern D (3rd gear mode). A gear mode given when the 2–4 brake system failure is detected, is the 3rd gear mode. By map-retrieval of the characteristic map of FIG. 8A, based on the system failure detection period gear mode (in this case, 3rd gear mode) and the actual state (A) of ON-OFF positions of the pressure switches SW1, SW2, and SW3, that is, (ON, ON, OFF), a solenoid output pattern E (4th gear mode) is selected. In other words, due to the occurrence of the 2–4 brake system failure, upshifting from third to fourth gear mode occurs. In this case, the system of the embodiment allows the transmission to upshift from 3rd to 4th gear mode (a safe gear mode). According to the selected solenoid output pattern E, the transmission is fixed to the 4th gear mode.

As will be appreciated from the above, even in the presence of a hydraulic system failure such as a high-clutch system failure, a 2–4 brake system failure, or a low-and-reverse brake system failure, the transmission control system of the embodiment can reliably detect such a hydraulic system failure by virtue of the fail-safe routine (see steps 101 through 117 in FIG. 6). A selected solenoid output pattern based on the actual state (A) of ON-OFF positions of the oil pressure switches (SW1, SW2, SW3) is read or retrieved from the preprogrammed map stored in the memory of ATCU 24. A command signal based on the selected solenoid output pattern, suitable for the respective hydraulic system failure, is output from the output interface circuitry of the ATCU. As a consequence, it is possible to avoid undesirable transmission interlock. By virtue of comparison between the actual state (A) of ON-OFF positions of the three oil pressure switches SW1, SW2, and SW3 and the set state (B) of ON-OFF settings estimated based on the current gear mode, it is possible to rapidly detect a hydraulic system failure at initial stages of occurrence of the hydraulic system failure. In other words, it is possible to discover a slight failure in the hydraulic system, and consequently to avoid a fatal damage to the hydraulic system. Additionally, as appreciated from the solenoid output pattern selection table of FIG. 8A and the solenoid output pattern table of FIG. 8B, these tables are preprogrammed, such that the gear mode selected based on the actual state of ON-OFF positions of the pressure switches (SW1, SW2, SW3) from the selection table of FIG. 8A, remains at the gear mode (the system failure detection period gear mode) just before detecting the hydraulic system failure, or is controlled or adjusted to an upshifting side with respect to the system failure detection period gear mode, or such that the transmission is shifted to neutral. Therefore, it is possible to avoid undesired wheel lock-up during vehicle driving. Furthermore, as appreciated from a transition from the flow from step 114 to step 115 to the flow from step 114 to step 116 (see FIG. 6), the selected gear mode, which is obtained at the solenoid output pattern shown in FIGS. 8A and 8B, used during the fail-safe operating mode occurring owing to hydraulic system failure, is accepted only for a time period from a time when the hydraulic system failure is detected to a time when the vehicle speed becomes less than the predetermined low speed value, that is, the actual driving condition of the vehicle reaches a predetermined low-speed driving condition. As a consequence, there is no risk of stopping the vehicle with the gear mode fixed. Moreover, in order to monitor the actual state of engagements/disengagements of engaging elements, the actual state of the ON-OFF positions of the three oil pressure switches (SW1, SW2, SW3) is detected instead of detection of an actual state of clutch engagements and band applications. These pressure switches are usually provided on an automotive vehicle with an automatic transmission as existing component parts. The use of such existing component parts eliminates the necessity of additional component parts, thus suppressing an increase in total production costs on ECT transmissions. According to the system of the embodiment, the state (A) actually detected and the normal state (B) estimated based the range gear mode are compared to each other, and if the states (A) and (B) disagree with each other continuously for a predetermined time period T1, a hydraulic system failure counter is incremented. The ATCU determines that the hydraulic system failure occurs only when the counted value of the hydraulic system failure counter reaches a predetermined counted value. This effectively avoids a misdiagnosis on a hydraulic system failure. Moreover, the system of the embodiment never makes a diagnosis on a hydraulic system failure, during shifting or during transmission range gear selection. Thus, it is possible to avoid a misdiagnosis of a hydraulic system failure, due to changes in hydraulic pressure in the hydraulic system during shifting or during range gear selection.

Figure 1:
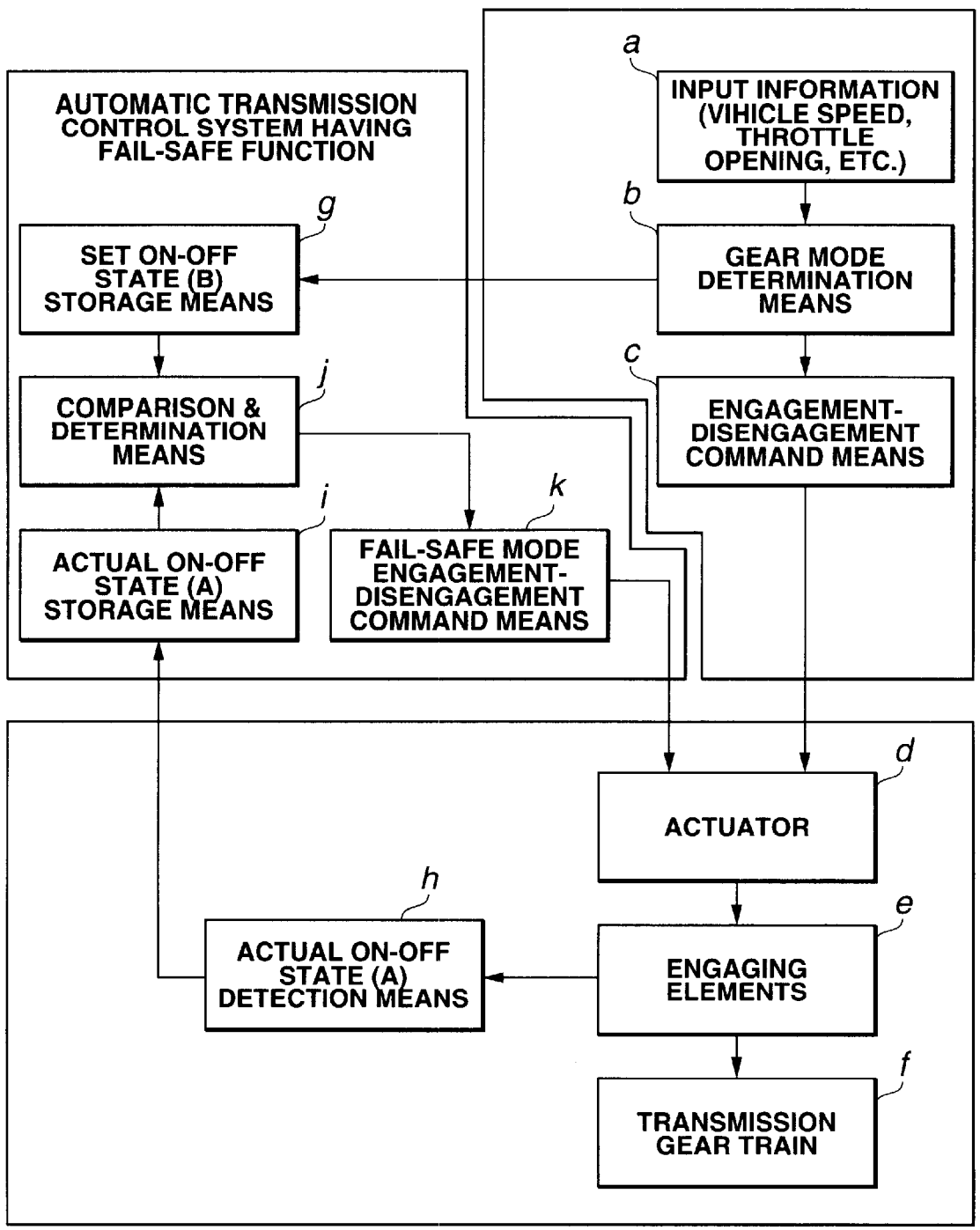
FIG. 1 is a block diagram illustrating the fundamental concept of an automatic transmission control system having a fail-safe function for an electronically-controlled automatic transmission (ECT transmission) of the invention.

Returning to FIG. 1, there is shown the fundamental concept of the transmission control system having a fail-safe function of the invention. As shown in FIG. 1, according to the transmission control system having the fail-safe function of the invention, input information (vehicle speed, throttle opening TH, and selected range and the like) is first detected by means of an input information detection means (engine/vehicle sensors) a. A gear mode determination means b determines a current gear mode is determined on the basis of more recent data concerning the selected range, the vehicle speed, and the throttle opening TH (see step 102 of FIG. 6). A command, corresponding to engagements (ON positions) and disengagements (OFF positions) for a plurality of engaging elements e (L/C, 2–4/B, H/C, L&R/B, R/C) and based on the current gear mode, is output from an engagement-disengagement command means c to an actuator d which operates the engaging elements. A multi-step speed-change emanates in a transmission gear train f by way of a combination of engagements and disengagements of the respective engaging elements e. At this time, a set ON-OFF state (B) storage means g estimates or determines a normal state (a set state) of engagements and disengagements of the engaging elements e on the basis of the current gear mode determined by the gear mode determination means b, and stores the set state (B) estimated based on the current gear mode (see step 105). On the other hand, an actual state (A) of engagements and disengagements of the engaging elements e is detected by way of an actual ON-OFF state (A) detection means h, and then the actual state (A) actually detected is stored by an actual ON-OFF state (A) storage means i (see step 103). A comparison-and-determination means j compares the actual state (A) stored in the actual that a hydraulic system failure (a system failure occurring in at least one of the engaging elements e) occurs when the actual state (A) detected and the set state (B) estimated disagree with each other. In this manner, when the comparison-and-determination means j determines that the hydraulic system failure occurs, a fail-safe mode engagement-disengagement command means k selects a specified gear mode based on the actual state of engagements and disengagements of the engaging elements, stored in the actual ON-OFF state storage means, and outputs a command corresponding to engagements and disengagements of the engaging elements to the actuator d associated with each of the engaging elements e, so that the automatic transmission is shifted to the specified gear mode which is preprogrammed or predetermined to be suitable for the actual state (A) of engagements and disengagements of the engaging failure. As discussed above, even when at least one of the engaging elements e has been failed, the engaging-element failure can be reliably detected by the comparison-and-determination means J. Upon detection of the hydraulic system failure, a command suitable for the fail-safe operating period is output from the fail-safe mode engagement-disengagement command means k to the actuator d, thereby avoiding undesirable transmission interlock. Comparison between the two states (A) and (B) ensures rapid detection of hydraulic system failure at initial states of occurrence of the hydraulic system failure. This avoids a fatal damage to the hydraulic system. As an additional feature of the system of the invention, the comparison-and-determination means j has a hydraulic system failure counter. A counted value of the hydraulic system failure counter is incremented once each time a state that the actual state (A) actually detected disagrees with the set state (B) estimated based on the current gear mode, occurs continuously for a predetermined time period (T1), and thereafter the comparison-and-determination means j determines that the hydraulic system failure occurs only when the counted value of the hydraulic system failure counter reaches a predetermined value. This avoids from the transmission control system from making a misdiagnosis upon a hydraulic system failure. Furthermore, the specified gear mode given or selected by the fail-safe mode engagement-disengagement command means k is preprogrammed or predetermined in a manner so as to remain at a gear mode determined by the gear mode determination means just before detecting the hydraulic system failure, or to be up-shifted with respect to the gear mode determined by the gear mode determination means just before detecting the hydraulic system failure, or in a manner so as to shift the automatic transmission to neutral. This reliably avoids undesired wheel lock-up during vehicle driving. The output of the command corresponding to the specified gear mode, selected by the fail-safe mode engagement-disengagement command means k is limited to only a time period from a time when the hydraulic system failure is detected to a time when the vehicle speed becomes less than the predetermined low speed value, that is, the actual driving condition of the vehicle reaches a predetermined low-speed driving condition. Thus, there is no risk of stopping the vehicle with the gear mode fixed. Moreover, clutches and applied/released band brakes). Generally, such an oil pressure switch is often provided on an automotive vehicle with an automatic transmission, and therefore the use of such an existing component part eliminates the need for additional component parts. This suppresses an increase in total production costs on ECT transmissions. The comparison-and-determination means j includes an inhibition means which inhibits a diagnosis upon a hydraulic system failure during shifting or during transmission range gear selection during which there is a transition of at least one of the engaging elements e from one of engaged and disengaged states to the other. Therefore, the system of the invention can avoid a misdiagnosis upon a hydraulic system failure, due to changes in hydraulic pressure in the hydraulic system during shifting or during transmission range gear selection.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An automatic transmission control system having a fail-safe function for an automatic transmission, comprising:

sensor means for detecting at least a throttle opening and a vehicle speed;

a gear mode determination means for determining a current gear mode based on the throttle opening and the vehicle speed;

an engagement-disengagement command means for outputting a command based on the current gear mode determined by said gear mode determination means and corresponding to engagements and disengagements for a plurality of engaging elements to an actuator which operates the engaging elements;

a transmission gear train which performs a multi-step speed-change by a combination of engagements and disengagements of the engaging elements;

a set ON-OFF state storage means for estimating a normal state of engagements and disengagements of the engaging elements based on the current gear mode, and for storing the normal state of engagements and disengagements of the engaging elements;

an actual ON-OFF state detection means for detecting an actual state of engagements and disengagements of the engaging elements;

an actual ON-OFF state storage means for storing the actual state of engagements and disengagements of the engaging elements;

a comparison-and-determination means for comparing the normal state of engagements and disengagements of the engaging elements, stored in said set ON-OFF state storage means, with the actual state of engagements and disengagements of the engaging elements, stored in said actual ON-OFF state storage means, and for determining that a hydraulic system failure occurs when the actual state detected and the normal state estimated disagree with each other; and a fail-safe mode engagement-disengagement command means for selecting a specified gear mode based on the actual state of engagements and disengagements of the engaging elements, stored in said actual ON-OFF state storage means, and for outputting a command corresponding to engagements and disengagements of the engaging elements to the actuator so that the automatic transmission is shifted to the specified gear mode which is preprogrammed to be suitable for the actual state, only when said comparison-and-determination means determines that the hydraulic system failure occurs.

2. The automatic transmission control system as claimed in claim 1, wherein said comparison-and-determination means has a hydraulic system failure counter whose counted value is incremented once each time a state that the actual state detected disagrees with the normal state estimated occurs continuously for a predetermined time period, and said comparison-and-determination means determines that the hydraulic system failure occurs only when the counted value of the hydraulic system failure counter reaches a predetermined value.

3. The automatic transmission control system as claimed in claim 1, wherein the specified gear mode selected by said fail-safe mode engagement-disengagement command means is preprogrammed to remain at a gear mode determined by said gear mode determination means just before detecting the hydraulic system failure, or to be up-shifted with respect to the gear mode determined by said gear mode determination means just before detecting the hydraulic system failure, or to shift the automatic transmission to neutral.

4. The automatic transmission control system as claimed in claim 1, wherein an output of the command corresponding to the specified gear mode selected by said fail-safe mode engagement-disengagement command means is limited to only a time period from a time when the hydraulic system failure is detected to a time when the vehicle speed becomes less than a predetermined low speed value.

5. The automatic transmission control system as claimed in claim 1, wherein said actual ON-OFF state detection means comprises an oil pressure switch provided for detecting a hydraulic pressure in a hydraulic system containing each of the engaging elements.

6. The automatic transmission control system as claimed in claim 1, wherein said comparison-and-determination means comprises an inhibition means inhibiting a diagnosis upon a hydraulic system failure during shifting or during transmission range gear selection during which there is a transition of at least one of the engaging elements from one of engaged and disengaged states to the other.

7. The automatic transmission control system as claimed in claim 5, wherein the engaging elements includes at least a low clutch, a 2–4brake, a high clutch, and a low-and-reverse brake, and said actual ON-OFF state detection means comprises a 2–4 brake oil pressure switch provided for detecting a 2–4 brake pressure in a 2–4 brake system containing the 2–4 brake, a high-clutch oil pressure switch provided for detecting a high clutch pressure in a high clutch system containing the high clutch, and a low-and-reverse brake oil pressure switch provided for detecting a low-and-reverse brake pressure in the low-and-reverse brake.

8. The automatic transmission control system as claimed in claim 7, wherein said set ON-OFF state storage means estimates the normal state of engagements and disengagements of the engaging elements by retrieving a normal state of ON-OFF settings of the 2–4 brake oil pressure switch, the high-clutch oil pressure switch, and the low-and-reverse brake pressure switch based on the current gear mode from a preprogrammed map showing how the normal state of ON-OFF settings varies relative to a transmission range gear mode, said actual ON-OFF state detection means detects the actual state of engagements and disengagements of the engaging elements by actually detecting an actual state of ON-OFF positions of the 2–4 brake oil pressure switch, the high-clutch oil pressure switch, and the low-and-reverse brake pressure switch, and said comparison-and-determination means compares the normal state of ON-OFF settings of the oil pressure switches with the actual state of ON-OFF positions of the oil pressure switches and determines that the hydraulic system failure occurs when the actual state of ON-OFF positions of the oil pressure switches and the normal state of ON-OFF settings of the oil pressure switches disagree with each other.

* * * * *